Jan. 1, 1929.  
G. F. ESSER  
1,697,001  
DISHWASHING APPARATUS  
Filed Sept. 30, 1927  2 Sheets-Sheet 1

Inventor:
Gustaf Ferdinand Esser
by
Attorney.

Jan. 1, 1929.  
G. F. ESSER  
1,697,001  
DISHWASHING APPARATUS  
Filed Sept. 30, 1927  2 Sheets-Sheet 2
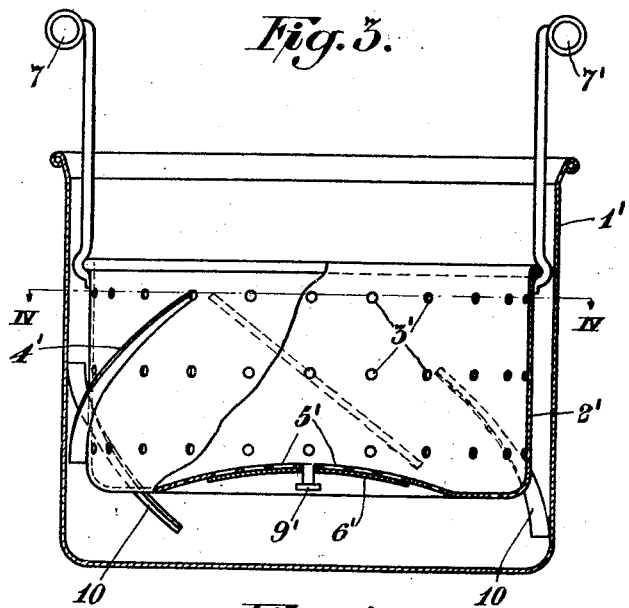
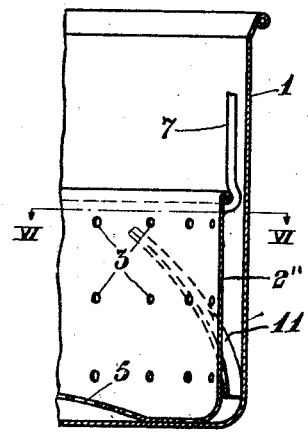
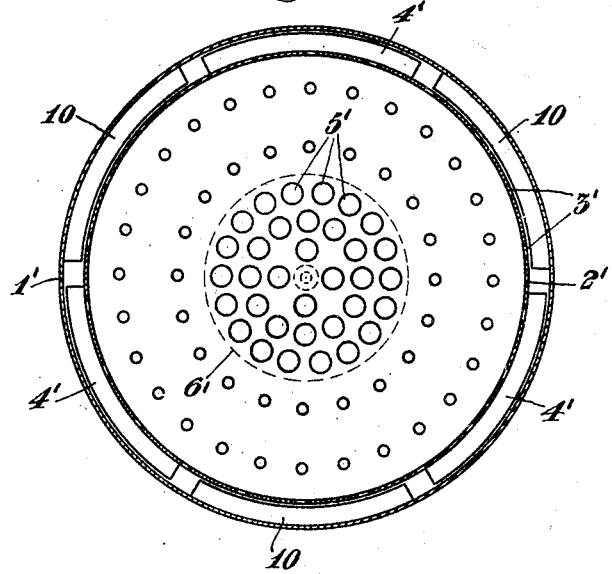
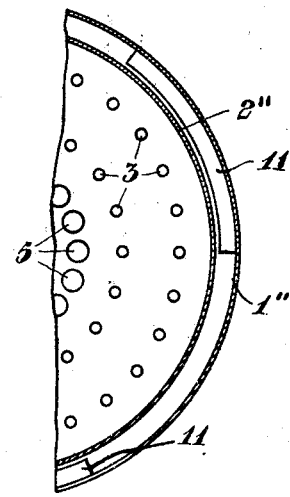
Inventor:  
Gustaf Ferdinand Esser  
Attorney.

Patented Jan. 1, 1929.

1,697,001

UNITED STATES PATENT OFFICE.

GUSTAF FERDINAND ESSER, OF STOCKHOLM, SWEDEN, ASSIGNOR TO AKTIEBOLAGET DISAKTOR, OF STOCKHOLM, SWEDEN, A COMPANY OF SWEDEN.

DISHWASHING APPARATUS.

Application filed September 30, 1927, Serial No. 222,974, and in Sweden September 25, 1925.

The present invention relates to a dish washing apparatus of the type which comprises an outer receptacle serving to hold the washing water, and an inner receptacle which serves to hold the dishes and which is adapted to be moved up and down in said outer receptacle, said inner dish holding receptacle being provided with a number of relatively small openings or holes for letting through the water, the washing of the dishes being effected by moving the dish holding receptacle up and down in said outer receptacle.

The invention has for its purpose to provide an apparatus of the type above referred to which shall be more efficient in operation and yet shall be simple in construction and manufacture. With this purpose in view the present invention consists broadly in that means are provided for causing the water pressed up in the space between the walls of said two receptacles when the inner receptacle is lowered into the outer receptacle, to perform a rotational movement in said space, whereby the water which flows into the inner receptacle through the holes in its wall and over its rim is put in a swirling motion over and around the dishes in the inner receptacle. Said means may consist of ribs or flanges located in the space between said two receptacles in a position oblique or helical to the axis of said receptacles, and said ribs may be attached to the outer surface of the inner receptacle, or they may be attached to the inner surface of the outer receptacle, or the apparatus may be provided with ribs on the inner receptacle as well as with ribs on the outer receptacle. Ribs parallel to the axis of the inner receptacle and secured to the outer surface of the same, may also be used.

Figure 1:
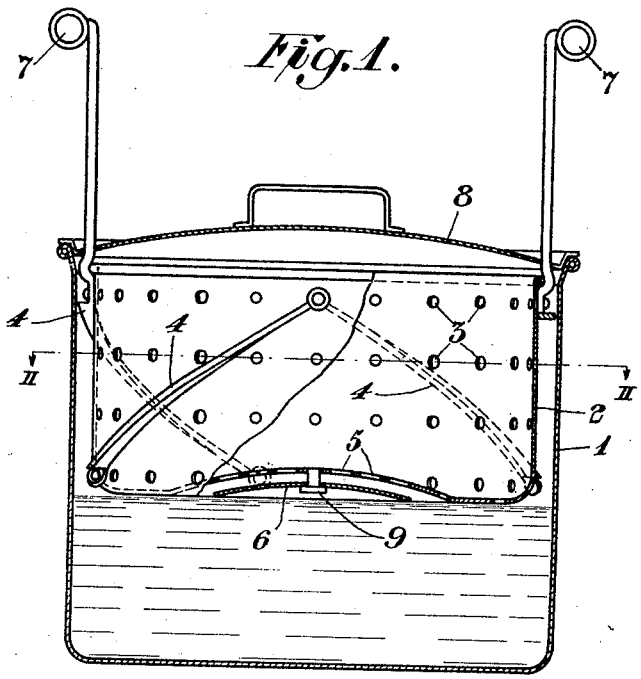
Figure 2:
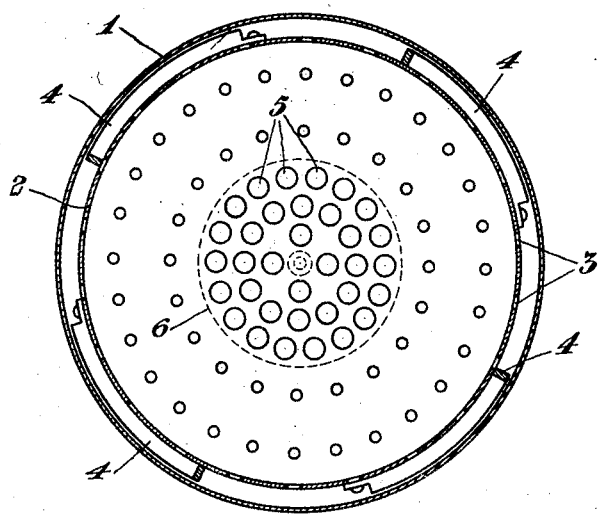

The accompanying drawings illustrate by way of example a few embodiments of the invention. Fig. 1 shows, partly in vertical section, a dish washing apparatus according to the invention, the inner receptacle being in raised position, and Fig. 2 shows a horizontal section of the apparatus on the line II—II in Fig. 1. Fig. 3 shows, also partly in vertical section, a second embodiment of a dish washing apparatus according to the invention, the inner receptacle occupying a position substantially half-way of its downward travel, and Fig. 4 shows a horizontal section on the line IV—IV in Fig. 3. Fig. 5 is a fragmentary vertical section and Fig. 6 a fragmentary horizontal section on the line VI—VI in Fig. 5, of a third embodiment of the invention.

Referring to Figs. 1 and 2, the apparatus comprises an outer receptacle 1 which serves to hold the washing water, which should preferably be hot, and an inner receptacle 2 which serves to hold the dishes to be washed. Said inner receptacle 2 is provided in its bottom and in its side wall with openings or holes 3 of a comparatively small size, and to the outer surface of its wall ribs or flanges 4 are secured in positions oblique or helical to the axis of the receptacle. As shown in Fig. 2, said ribs have a width substantially equal to the width of the annular space between the outer and inner receptacles. In the bottom of the inner receptacle 2 there is provided a number of relatively large-sized holes 5 which are adapted to be closed from the under side by means of a valve disk 6 which is slidable on a stud 9 secured to the bottom of the receptacle 2. Secured to said inner receptacle 2 are two handles 7 serving for operating the apparatus, said handles reaching up above the outer receptacle 1 and passing through slots in the edge of the lid 8 of said outer receptacle.

The apparatus operates in the following manner: The dishes to be washed are placed in the dish holding receptacle 2 which is then placed in the outer receptacle 1 over which the lid 8 is placed to prevent the steam from the water from escaping. By means of the handles 7 the inner receptacle 2 is forced downwards in the receptacle 1 with the result that the water in the latter presses the valve disk 6 upwards to close the holes 5 in the bottom of the receptacle 2. The water in the receptacle 1 is therefore pressed upwards in the annular space between the two receptacles 1 and 2, and is also forced through the holes 3 into the inner receptacle 2 as powerful jets playing over the dishes in said receptacle. Owing to the obliquely or helically positioned ribs 4 the water is caused to perform a rotational movement in the annular space between the two receptacles owing to which the water which flows from said annular space over the rim of the inner receptacle 2, and to a certain extent also the above mentioned jets of water from the holes 3, obtain a swirling motion in said inner receptacle so that the dishes in the same become thoroughly flushed and washed. When the inner receptacle reaches the bottom of the outer receptacle, it is again raised by means of the handles 7, and upon such reversal of movement the valve 6 will of course open and allow the water within the receptacle 2 rapidly to flow out through the large holes 5. The inner receptacle 2 is now pushed down again, and the operation is repeated a sufficient number of times. Owing to the bottom valve 6 opening automatically upon upward movement of the inner receptacle 2, very little force is required for operating the apparatus.

The apparatus illustrated in Figs. 3 and 4 differs from the one above described and illustrated in Figs. 1 and 2 only in that there are provided, in addition to the ribs 4' secured to the outside of the inner receptacle 2', also ribs 10 secured to the inside of the outer receptacle 1'. Said ribs 10 are also obliquely or helically positioned relatively to the axis of the receptacles, and have a width substantially equal to the width of the annular space between the receptacles. When upon downward movement of the inner receptacle 2' the water in the outer receptacle is forced upwards in the annular space between the two receptacles, the ribs 10 will of course also aid to put the water in a rotational movement. It will therefore be easily understood that the ribs 4 on the inner receptacle may be omitted and the apparatus provided only with ribs 11 on the inside of the outer receptacle 1'', as shown in Figs. 5 and 6, this construction being in other respects similar to that illustrated in Figs. 3 and 4.

I claim:

1. In a dish washing apparatus, the combination of an outer receptacle, an inner dish holding receptacle movable up and down in said outer receptacle and having a less width than said outer receptacle leaving a space between the walls of said receptacles, said inner receptacle having holes in its wall, and ribs in said space between the walls of said receptacles positioned substantially helically to the axis of said receptacles.

2. In a dish washing apparatus, the combination of an outer receptacle, an inner dish holding receptacle movable up and down in said outer receptacle and having a less width than said outer receptacle leaving a space between the walls of said receptacles, said inner receptacle have holes in its wall, and ribs secured to the outside of said inner receptacle in a substantially helical position relatively to the axis of said inner receptacle.

3. In a dish washing apparatus, the combination of an outer receptacle, an inner dish holding receptacle movable up and down in said outer receptacle and having a less width than said outer receptacle leaving a space between the walls of said receptacles, said inner receptacle having holes in its wall, ribs secured to the outside of said inner receptacle in a substantially helical position relatively to the axis of said receptacle, apertures in the bottom of said inner receptacle, and a valve adapted to close said apertures upon downward movement of said receptacle and to open said apertures upon upward movement of said receptacle.

4. In a dish washing apparatus, the combination of an outer receptacle, an inner dish holding receptacle movable up and down in said outer receptacle and having a less width than said outer receptacle leaving a space between the walls of said receptacles, said inner receptacle having holes in its wall, ribs secured to the outside of said inner receptacle in a substantially helical position relatively to the axis of said receptacle, and ribs secured to the inside of said outer receptacle in a substantially helical position relatively to the axis of said receptacle.

5. In a dish washing apparatus, the combination of an outer receptacle, an inner dish holding receptacle movable up and down in said outer receptacle and having a less width than said outer receptacle leaving a space between the walls of said receptacles, said inner receptacle having holes in its wall, ribs secured to the outside of said inner receptacle in a substantially helical position relatively to the axis of said receptacle, ribs secured to the inside of said outer receptacle in a substantially helical position relatively to the axis of said receptacle, apertures in the bottom of said inner receptacle, and a valve adapted to close said apertures upon downward movement of said receptacle and to open said apertures upon upward movement of said receptacle.

6. In a dish washing apparatus, the combination of an outer receptacle, an inner dish holding receptacle movable up and down in said outer receptacle and having a less width than said outer receptacle leaving a space between the walls of said receptacles, said inner receptacle having holes in its wall, and ribs secured to the inside of said outer receptacle in a substantially helical position relatively to the axis of said receptacle.

GUSTAF FERDINAND ESSER.